United States Patent
Lee

(10) Patent No.: US 7,937,071 B2
(45) Date of Patent: May 3, 2011

(54) DEVICE MANAGEMENT SYSTEM AND METHOD OF CONTROLLING THE SAME

(75) Inventor: Joonho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 851 days.

(21) Appl. No.: 11/765,203

(22) Filed: Jun. 19, 2007

(65) Prior Publication Data

US 2008/0072043 A1 Mar. 20, 2008

(30) Foreign Application Priority Data

Sep. 19, 2006 (KR) .................. 10-2006-0090792

(51) Int. Cl.
*H04M 3/16* (2006.01)
(52) U.S. Cl. ........ 455/411; 455/410; 713/176; 713/181; 713/170; 713/169; 380/274; 726/22
(58) Field of Classification Search .................. 455/411; 713/176, 181, 170, 169; 726/22; 380/274
See application file for complete search history.

(56) References Cited

U.S. PATENT DOCUMENTS

| 2003/0061488 A1* | 3/2003 | Huebler et al. ............... 713/176 |
| 2005/0033693 A1* | 2/2005 | Toiminen ......................... 705/43 |
| 2007/0011446 A1* | 1/2007 | Kato et al. ..................... 713/150 |

\* cited by examiner

*Primary Examiner* — Charles N Appiah
*Assistant Examiner* — Randy Peaches
(74) *Attorney, Agent, or Firm* — Birch, Stewart, Kolasch & Birch, LLP

(57) ABSTRACT

A device management (DM) system and a method of controlling the same, are discussed. According to an embodiment, the DM system comprises a DM server for transmitting a notification message in response to a device control request of a user, the notification message including unique authentication information having previously stored unique information of a device and basic authentication information having a setup value for setting up communication; and a device having a DM client, for receiving the notification message, performing authentications using the basic authentication information and the unique authentication information, and discarding the notification message if the authentications using the basic authentication information and the unique authentication information fail.

19 Claims, 6 Drawing Sheets

RELATED ART

DEVICE MANAGEMENT SYSTEM AND METHOD OF CONTROLLING THE SAME

This Nonprovisional application claims priority under 35 U.S.C. §119(a) on Patent Application No. 10-2006-0090792 filed in Korea on Sep. 19, 2006, the entire contents of which are hereby incorporated by reference.

BACKGROUND

1. Field

The present invention relates to a device management system and a method of controlling the same.

2. Related Art

The development of device management (DM) is in progress as an international standard based on a synchronization markup language (SyncML) which is a data synchronization standard of Open Mobile Alliance (OMA). OMA DM defines various specifications related to a device management protocol, a device management document expression, transmission protocol binding, a device description framework (DDF), and a notification.

Basically, in order to manage devices, a DM server transmits a command to a device with a DM client installed therein, and the DM client in the device performs operations according to the received command and reports the result thereof to the DM server.

The DM server transmits a notification message to the device with the DM client (the DM client device) to request the device to access the DM server. Then, the DM client of the device performs authentication using information included in the notification message to determine whether or not the access request of the DM server is legitimate. The structure of the notification message is defined in the DM notification specification in the OMA standard.

FIG. 1 is a diagram illustrating a structure of such a notification message sent from the DM server to the DM client device according to OMA DM.

As shown in FIG. 1, the notification message 1 comprises a digest field 3 for authentication, a trigger header field 5 for storing device control information, and a trigger body field 7 for storing control codes to control a device such as a DM client device.

The digest field 3 is allocated with 128 bits according to the OMA standard. A digest 9 is calculated using a message digest algorithm 5 (MD5) and is inserted into the digest field 3. The MD5 is an algorithm used to authenticate data integrity and defined in IETF RFC 1321. A digest ("Digest" below) calculating equation is shown below.

<digest calculating equation>

$$\text{Digest} = H(B64(H(\text{server-identification: password})): \text{nonce}: B64(H(\text{trigger})))$$

H: MD5 Hash function
B64: Encoding format Base 64 MIME

As shown above, the digest 9 is calculated by applying predetermined factors to the MD5 Hash function. The predetermined factors are a server-identifier, a password, the values of the trigger header field 5 and the trigger body field 7 in the notification message 1 except the digest field 3, and a nonce value.

The nonce value is a random number for encoding data when a server and a client set up a session and communicate with each other through the session. A DM client uses the nonce value included in the digest 9 to establish a session with the server in order to communicate with the server through the established session. If an error is generated in the nonce value due to the failure of setting up the session or data omission, the server and the client fail to match with each other. Such a phenomenon is called a stale nonce.

In a DM system according to the related art, if the stale nonce occurs while performing authentication using the digest 9 of the notification message 1, a DM client tries to access a DM server after determining whether or not the access request of the DM server is legitimate by setting up the nonce value to a default value 0x0000000, or the DM client tries to access the DM server regardless of whether the authentication is successful or failed. That is, denial of service attack (DOS) occurs.

As described above, when the DM clients receive a notification message from the DM server, the DM clients, who failed in the session matching with the DM server, try to access the DM server constantly although the authentication using the digest has failed. As a result, the related art DM has the problem of the denial of service attack.

SUMMARY

Accordingly, an aspect of the present invention is to address at least the problems and disadvantages of the related art.

An aspect of the present invention is to provide a control method of a device management system comprising a DM (device management) server and a DM client controlling operations of a device in response to a command of the DM server. In the control method according to an embodiment, the DM server creates unique authentication information having unique information of the device in response to a device control request from a user. Then, the DM server creates basic authentication information having a set value for establishing a communication link between the DM server and the DM client, and inserts the basic authentication information and the unique authentication information into a notification message and transmits the notification message to the DM client. Then, the DM client tries to perform authentication using the unique authentication information if the DM client receiving the notification message fails to authenticate the device control request using the basic authentication information. The DM client dumps the notification message it the DM client fails to authenticate the device control request using the unique authentication information.

The step of creating the unique authentication information may comprise creating the unique authentication information using at least one of an IMEI (international mobile equipment identifier) and an ESN (electronic serial number) of the device.

The step of creating the basic authentication information may comprise creating the basic authentication information including a nonce value that is a setup value for setting communication between the DM server and the DM client.

The step of inserting the basic authentication information and the unique authentication information into the notification message and transmitting the notification message to the DM client may comprise inserting the basic authentication information and the unique authentication information into an authentication information insertion region of the notification message, defined in the OMA (open mobile alliance) standard.

The step of inserting the basic authentication information and the unique authentication information into the notification message and transmitting the notification message to the DM client may comprise inserting the basic authentication information to an authentication information insertion region of the notification message, which is defined in the OMA standard; and inserting the unique authentication information to one of a trigger header field and a trigger body field of the notification message and transmitting the notification message to the DM client.

The control method may further comprise attempting to access the DM server when the authentication using the basic authentication information is successful.

The control method may further comprise attempting to access the DM server when the authentication using the unique authentication information is successful.

Another aspect of the present invention is to provide a device management system comprising: a DM (device management) server and a device with a DM client installed therein. The DM server transmits a notification message, which includes unique authentication information having previously stored unique information of a device and basic authentication information having a setup value for setting up communication, in response to a device control request of a user. The DM client of the device receives the notification message, performs authentication using the basic authentication information and the unique authentication information, and dumps the notification message if both authentications using the basic authentication information and the unique authentication information fail.

The DM server may create the unique authentication information using at least one of an IMEI (international mobile equipment identifier) and an ESN (electronic serial number) of the device.

The DM server may create the basic authentication information including a nonce value that is a setup value for setting communication with the DM client.

The DM server may insert the basic authentication information and the unique authentication information to an authentication information insertion region of a notification message, defined by the OMA (open mobile alliance) standard.

The DM server may insert the basic authentication information into an authentication information insertion region of a notification message, defined by the OMA (open mobile alliance) standard, and the unique authentication information into one of a trigger header field and a trigger body field of the notification message.

The DM client may try to access the DM server when the authentication is successful using at least one of the basic authentication information and the unique authentication information.

According to another aspect of the present invention, there is provided a control method of a device management system including a device management (DM) server and a DM client for controlling operations of a device in response to a command of the DM server, the control method comprising: creating, by the DM server, unique authentication information having unique information of the device in response to a device control request from a user; creating basic authentication information having a set value for establishing a communication link between the DM server and the DM client; inserting the basic authentication information and the unique authentication information into a notification message and transmitting the notification message to the DM client; attempting to perform authentication using the unique authentication information, if the DM client receiving the notification message fails to authenticate the device control request using the basic authentication information; and discarding, by the DM client, the notification message if the DM client fails to authenticate the device control request using the unique authentication information.

According to another aspect of the present invention, there is provided a device management (DM) system comprising: a DM server for transmitting a notification message in response to a device control request of a user, the notification message including unique authentication information having previously stored unique information of a device and basic authentication information having a setup value for setting up communication; and a device having a DM client, for receiving the notification message, performing authentications using the basic authentication information and the unique authentication information, and discarding the notification message if the authentications using the basic authentication information and the unique authentication information fail.

According to another aspect of the present invention, there is provided a terminal comprising: a device management (DM) client to receive a notification message from a server to perform a terminal control operation, the notification message including basic authentication information having a set value for establishing a communication link between the server and the DM client and unique authentication information having unique information of the terminal, wherein the DM client performs at least one authentication based on the notification message.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in detail with reference to the following drawings in which like numerals refer to like elements.

DETAILED DESCRIPTION

Embodiments of the present invention will be described in a more detailed manner with reference to the drawings.

It is an object of the present invention to provide a device management system and a method of controlling the same for preventing denial of service attack (DOS) of DM clients that fail in a session matching to a DM server due to a notification message error, by providing an authentication method using a digest of a client device which receives a notification message in devices control of OMA DM.

Hereinafter, a device management system and a method of controlling the same will be described in detail with reference to the drawings in accordance with an embodiment of the present invention. The DM system includes one or more DM servers and one or more devices having DM clients therein. The DM servers and the DM client devices communicate with each other via known protocols and/or networks. The DM client devices can be computers, mobile terminals, smart phones, computer lap-tops, PDAs, etc.

Figure 1:
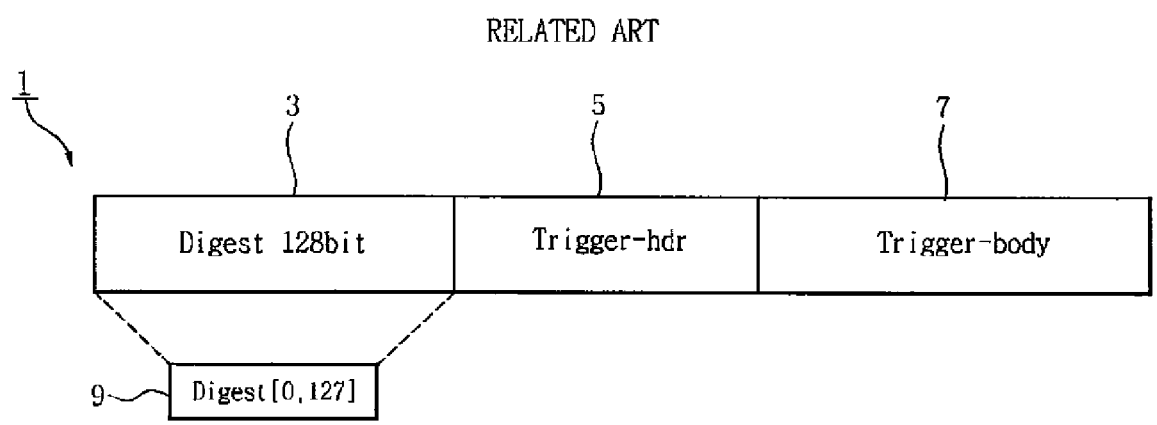
FIG. 1 is a diagram illustrating a structure of a general notification message according to OMA DM.
Figure 2:
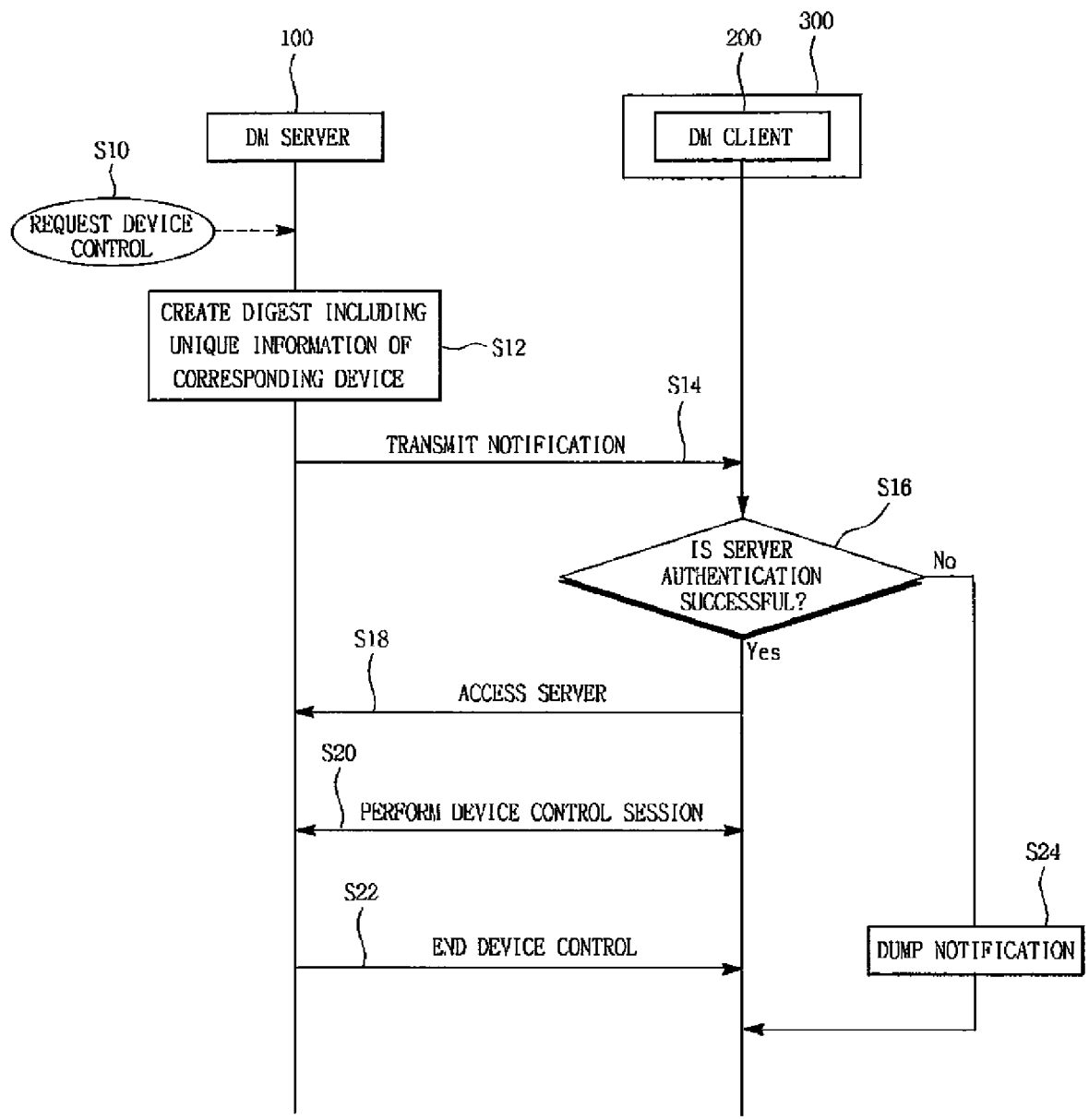
FIG. 2 is a flowchart of a DM system in accordance with an exemplary embodiment of the present invention.

FIG. 2 is a flowchart of a DM system in accordance with an exemplary embodiment of the present invention.

At step S10, a user requests a DM server 100 to control a device with a DM client installed therein. Then, the DM server 100 creates a digest comprising unique information of the corresponding device (e.g., device 300 having a DM client 200) for authentication at step S12.

The DM server 100 requests the device 300 to access the DM server 100 by transmitting a notification message including the created digest to the device 300 with the DM client 200 installed therein at step S14.

The DM client 200 authenticates the DM server 100 through the digest in the notification message in order to determine whether the access request from the DM server 100 is legitimate or not at step S16.

If the DM client 200 fails to authenticate the DM server 100 through the digest, the DM client 200 dumps the received notification message at step S24, and the DM client 200 transits to a waiting state.

On the contrary, if the DM client 200 succeeds in authenticating the DM server 100 through the digest, the DM client 200 tries to access the URL address of the DM server 100 at step S18. Then, a device control session is performed between the DM server 100 and the DM client 200, thereby controlling the device 300 having the DM client 200 at step S20.

After controlling the device 300 having the DM client 200, the DM server 100 terminates the device control session at step S22, and the DM client 200 transits to a waiting state.

As described above, in the DM system according to the present embodiment, the DM server 100 creates the digest including the unique information of the corresponding device (e.g., device 300) for authentication when the DM server 100 transmits the notification message to the DM client 200, and the DM client 200 tries to access the DM server 100 when the authentication is successful through the digest.

Figure 3:
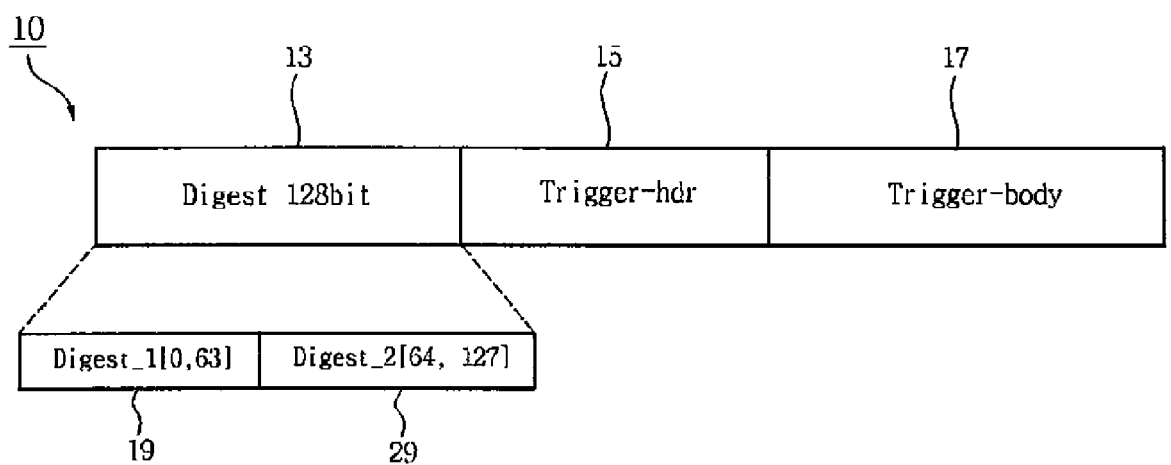
FIG. 3 is a diagram illustrating a data structure of a notification message in accordance with an embodiment of the present invention.
Figure 4:
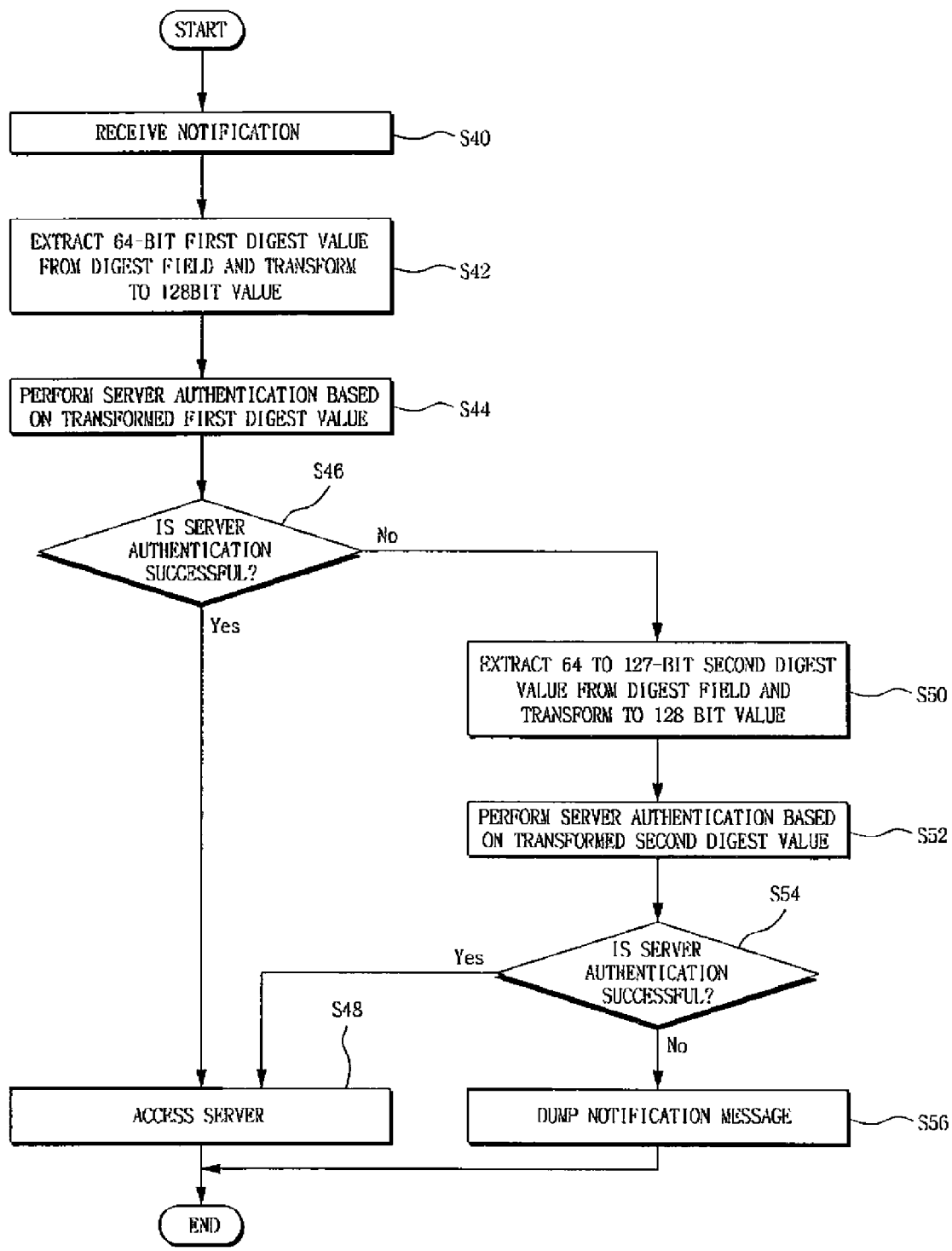
FIG. 4 is a flowchart of an authentication method of a DM system in accordance with an exemplary embodiment of the present invention.

FIG. 3 is a diagram illustrating a data structure of a notification message 10 in accordance with an embodiment of the present invention, and FIG. 4 is a flowchart illustrating a method of authentication using the notification message of FIG. 3 in the DM client 200 according to the present invention. The notification 10 is an example of the notification message sent from the DM server 100 to the DM client 200 at step S14 in FIG. 2.

As shown in FIG. 3, the notification message 10 according to the present system comprises a digest field 13 for authentication, a trigger header field 15 for storing device control information, and a trigger body field 17 for storing a control code for controlling a device such as the device 300.

The digest is a simply text sequence uniquely generated per each message. That is, the digest is a predetermined length of a bit sequence created and contracted by repeatedly applying a predetermined length of a message to a one-way hash function. The digest is a checksum for determining whether an original document is modified or not. The digest field 13 is allocated with 128 bits according to the OMA standard, and a digest calculated by a message digest algorithm 5 (MD5) is inserted therein. The MD5 is an algorithm used for authenticating data integrity by generating a 128-bit text sequence regardless of the size of input data. Since the MD5 is defined in IFTF RFC 1321 standard, the detailed description thereof will be omitted.

In the present embodiment, two digests are created by using a first digest calculating equation and a second digest calculating equation. In the present embodiment, two digests 19, 29 respectively generated by the below first and second digest calculating equations are inserted in the digest field 13.

<first digest calculating equation>

Digest_1=H(B64(H(server-identifier: password)):nonce:B64(H(trigger)))

<second digest calculating equation>

Digest_2=H(B64(H(server-identifier: password):IMEI:B64(H(trigger)))

H: MD5 Hash function
B64: encoding format Base64 MIME

H: MD5 Hash function1
B64: encoding format Base64 MIME

As described above, the first digest 19 is calculated by applying factors to a MD5 Hash function according to the above first digest calculating equation. The factors are, but not limited to, a server-identifier, a password, the values of the trigger header field 15 and the trigger body field 17 in the notification message except the digest field 13, and a nonce value. Herein, the nonce value is a random number or value to use for encoding data when a server and a client establish a session and communicate with one another through the session. That is, it is a set value for establishing a communication link between the DM server and the DM client. The DM client 200 establishes a session with the DM server 100 using the nonce value include in the digest so that the DM server 100 and the DM client 200 are matched and communicate with each other. In this regard, as a variation, the first digest may be calculated based on the nonce value and some other information such as one or more of the factors mentioned above. The first digest Digest_1 19 is calculated as 128 bits through the first digest calculating equation. Then, the 128-bit first digest is transformed to a 64-bit digest using a hash table, and then the 64-bit first digest is inserted to a 0 to 63 bit region of the digest field 13.

The second digest 29 is calculated by applying predetermined factors to a MD5 Hash function according to the above second digest calculating equation. The predetermined factors are, but not limited to, a server-identifier, a password, the values (trigger) of the trigger header field 15 and the trigger body field 17 in the notification message except the digest field 13, and an international mobile equipment identifier (IMEI) that is unique information of the corresponding device. Herein, the unique information is a value stored to identify a target device (e.g., device 300 having the DM client 200) when a DM target device is registered at the DM server 100. Also, instead of the IMEI, an electronic serial number (ESN) that is uniquely assigned to each device can be used, or at least one of the IMEI and the ESN may be used to generate the second digest. As a variation, the second digest may be calculated based on other information as long as it is based on information that is unique to the device or uniquely identifies the device. The second digest Digest_2 29 calculated by applying the predetermined factors into the second digest calculating equation has a 128 bit value. Then it is transformed to a 64-bit value, and then the 64 bit value is inserted at 64 to 127 bit locations of the digest field 13.

As described above, the first digest Digest_1[0,63] 19 and the second digest Digest_1[64,127] 29 are inserted into the 128-bit digest field 13, and the DM client 200 performs a first authentication and a second authentication respectively through the first digest 19 and the second digest 29 in the notification message 10, thereby determining whether the access request of the service is legitimate or not.

FIG. 4 is a flowchart of an authentication method of a DM system in accordance with an exemplary embodiment of the present invention. That is, FIG. 4 shows an authentication method used when the DM client 200 receives the notification message including the first digest Digest_1[0,63] and the second digest Digest_2[64, 127] included in the digest field [0,127] 13 of the message.

At step S40, the DM client 200 receives a request message (or notification message 10) for device management provided from the DM server 100.

The DM client 200 extracts the first digest Digest_1[0,63] 19 from the digest field 13 and transforms the extracted first digest to a 128 bit value based on a predetermined method such as a hash table at step S42.

The DM client 200 performs server authentication based on the first digest 19 which is transformed to the 128 bit value at step S44, and determines whether the access request of the DM server 100 is legitimate or not at step S46.

When the server authentication is successful, The DM client 200 tries to access the corresponding server (i.e., the DM server 100) at step S48.

On the contrary, if the first server authentication fails at step S46, the DM client 200 extracts the second digest Digest_2 [64, 127] from the 64 to 127 bit region of the digest field 13 for the second authentication, and transforms the extracted second digest to a 128 bit value using a predetermined method such as a Hash table at step S50.

The DM client 200 performs server authentication based on the second digest transformed to the 128 bit value at step S52, and determines whether the access request of the DM server 100 is legitimate or not at step S54.

If the second server authentication is successful at step S54, the DM client 200 tries to access the corresponding server (DM server 100) at step S48.

On the contrary, if the second server authentication through the second digest Digest_2[64,127] 29 fails at step S54, the DM client 200 dumps the received notification message 10 at step S56, and transits to a waiting state.

As described above, the DM system according to the present embodiment performs the first server authentication using the first digest Digest_1[0, 63] 19 having the nonce value, and performs the second server authentication using the second digest Digest_2[64, 127] 29 having the device (e.g., device 300) unique information if the first server authentication fails. If the first and second server authentications fail, the corresponding notification message is dumped, and the DM client 200 does not try to access the DM server 100.

Figure 5:
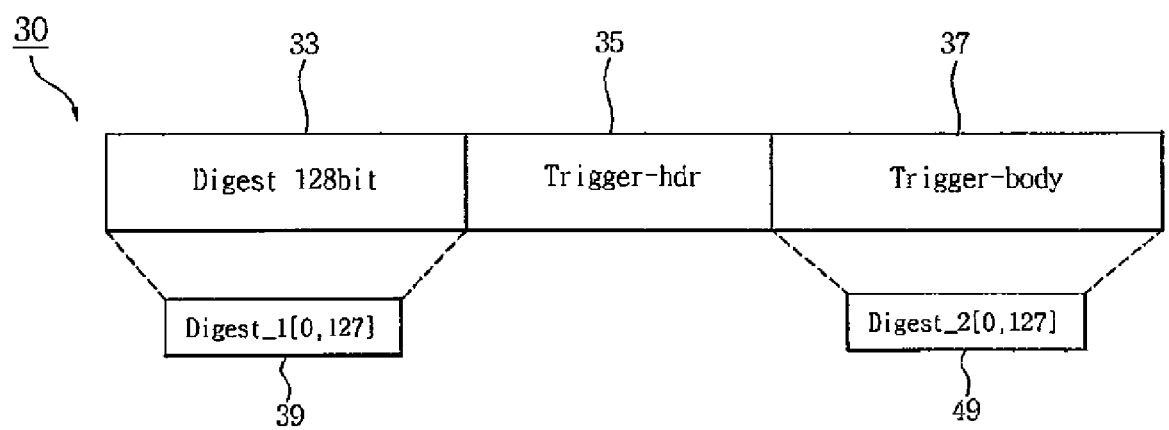
FIG. 5 is a diagram illustrating a data structure of a notification message in accordance with another embodiment of the present invention.
Figure 6:
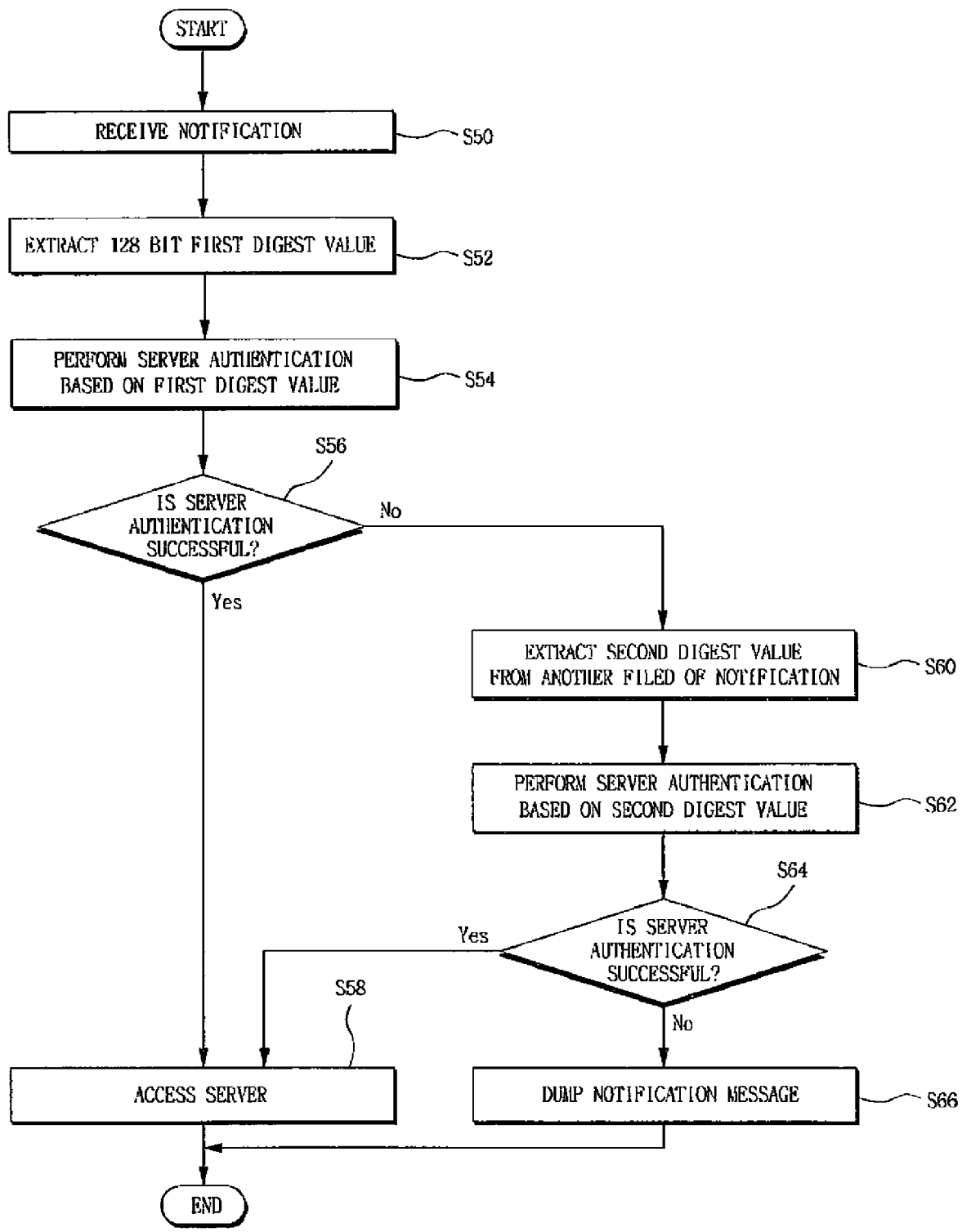
FIG. 6 is a flowchart of an authentication method of a DM system in accordance with an embodiment of the present invention.

FIG. 5 is a diagram illustrating a data structure of a notification message 30 in accordance with another embodiment of the present invention, and FIG. 6 is a flowchart of an authentication method of a DM client 200 using the notification message 30 of FIG. 5 according to the present invention. The notification message 30 can be an example of the notification message sent from the DM server 100 to the DM client 200 at step S14 in FIG. 2.

As shown in FIG. 5, the notification message 30 according to an embodiment comprises a digest field 33 for authentication, a trigger header field 35 for storing device control information, and a trigger body field 37 for storing a control code for controlling a device. In this embodiment, two digests 39, 49 are created respectively through the above first digest calculating equation and the above second digest calculating equation, and the created two digests are inserted respectively into the digest field 33 and the trigger body field 37 of the message 30.

The first digest 39 is calculated by applying factors to a MD5 Hash function according to the above first digest calculating equation. The factors are, but not limited to, a server-identifier, a password, the values (trigger) of the trigger header field 35 and the trigger body field 37 in the notification message 30 except the digest field 33, and a nonce value. The first digest Digest_1 39 is calculated as a 128 bit value, and is inserted into the digest field 33.

The second digest 49 is calculated by applying predetermined factors to a MD5 Hash function according to the above second digest calculating equation. The predetermined factors are, but not limited to, a server-identifier, a password, the values (trigger) of the trigger header field 35 and the trigger body field 37 in the notification message 30 except the digest field 33, and an international mobile equipment identifier (IMBI) that is unique information of a corresponding device. Herein, the unique information is a value stored to identify a target device (e.g., device 300 having the DM client 200) when a DM target device is registered at the DM server 100. Also, instead of the IMEI, an electronic serial number (ESN) that is uniquely assigned to each device can be used, or at least one of the IMEI and the ESN may be used to generate the second digest. In fact, information that is unique to or uniquely identifies the device 300 may be ased to generate the second digest. The second digest Digest_2 49 is calculated as a 128 bit value, and inserted into the trigger body field 37.

The trigger body field 37 is a data space for a device provider to insert control data for DM, and has a residual space for adding data. In another embodiment, the second digest Digest_2 49 having the device unique information can be inserted at the last bit of the trigger body field 37. In another example, the second digest 49 may be inserted in the trigger head field 35 of the message 30.

As described above, the first digest Digest_1[0,127] 39 and the second digest Digest_2 [0, 127] 49 are inserted respectively into the digest field 33 and the trigger body field 37, and the first and second authentications are performed respectively through the first digest 39 and the second digest 49 included in the notification message 30, thereby determining whether the access request of the server is legitimate or not.

FIG. 6 is a flowchart of an authentication method of a DM system in accordance with an embodiment of the present invention. In the authentication method according to this embodiment, a server authentication is performed using the first digest Digest_1[0,127] 39 in the digest field 33, and the second digest Digest_2[0,27] 49 in the trigger body field 37.

At step S50, the DM client 200 receives a request message (e.g., notification message 30) for device management provided from the DM server 100.

The DM client 200 extracts a 238 bit first digest Digest_1 [0,127] 39 from the digest field 33 of the message 30 at step S52.

The DM client 200 performs server authentication based on the first digest Digest_1 39 at step S54, and determines whether the access request of the server is legitimate or not at step S56.

When the server authentication is successful at step S56, the DM client 200 tries to access a corresponding server (e.g., the DM server 100) at step S58.

On the contrary, if the server authentication fails at step S56, the DM client 200 extracts the second digest Digest_2[0, 127] 49 from the trigger body field 37 for the second authentication at step S60.

The DM client 200 performs server authentication based on the second digest Digest_2 49 at step S62, and determines whether the access request of the DM server 100 is legitimate or not at step S64.

If the server authentication is successful at step S64, the DM client 200 tries to access the corresponding server (e.g., DM server 100) at step S58.

On the contrary, if the second server authentication through the second digest Digest_2 49 fails at step S64, the DM client 200 dumps the received notification message 30 at step S66, and transits to a waiting state.

As described above, the DM system according to the present embodiments inserts the first digest having the nonce value and the second digest having the unique information of a corresponding device into an authentication information insertion region of the notification message, defined in the OMA (open mobile alliance). The DM system allows the DM client 200 to perform the second server authentication using the second digest if the first server authentication using the first digest fails. If the first and second server authentications fail, the corresponding notification message is discarded, and the DM client 200 is restricted not try to access the DM server 100.

Therefore, the authentication function through the notification message is enhanced, and the denial of service attack (DOS) from the DM clients who fail on the session matching with the DM server due to the error of the notification message is prevented or minimized.

The foregoing exemplary embodiments and aspects of the invention are merely exemplary and are not to be construed as limiting the present invention. The present teaching can be readily applied to other types of apparatuses or systems. Also, the description of the exemplary embodiments of the present invention is intended to be illustrative, and not to limit the scope of the claims, and many alternatives, modifications, and variations will be apparent to those skilled in the art.

What is claimed is:

1. A control method of a device management system, the device management system including a device management (DM) server and a DM client, the DM client for controlling operations of a device in response to a notification message from the DM server, the notification message including 64 bits of unique authentication information having unique information of the device and including 64 bits of basic authentication information having a set value for establishing a communication link between the DM server and the DM client, the control method comprising:
   receiving the notification message by the DM client;
   extracting, by the DM client, the basic authentication information from the received notification message and transforming the extracted basic authentication information from 64 bits to 128 bits of basic authentication information;
   attempting, by the DM client, to perform authentication using the transformed basic authentication information;
   if the DM client fails to authenticate the device control request using the transformed basic authentication information, extracting the unique authentication information from the received notification message, transforming the extracted unique authentication information from 64 bits to 128 bits of unique authentication information, and attempting to perform authentication using the extracted unique authentication information; and
   discarding, by the DM client, the notification message if the DM client fails to authenticate the device control request using the transformed unique authentication information.

2. The control method as claimed in claim 1, further comprising:
   creating, by the DM server, the 64 bits of unique authentication information;
   creating, by the DM server, the 64 bits of basic authentication information; and
   inserting, by the DM server, the basic authentication information and the unique authentication information into the notification message and transmitting the notification message to the DM client.

3. The control method as claimed in claim 2, wherein the step of creating the unique authentication information comprises:
   creating the unique authentication information using at least one of an IMEI (international mobile equipment identifier) and an ESN (electronic serial number) of the device.

4. The control method as claimed in claim 3, wherein the step of inserting the basic authentication information and the unique authentication information into the notification message and transmitting the notification message to the DM client comprises:
   inserting the basic authentication information and the unique authentication information into an authentication information insertion region of the notification message, defined in OMA (open mobile alliance) standard.

5. The control method as claimed in claim 3, wherein the step of inserting the basic authentication information and the unique authentication information into the notification message and transmitting the notification message to the DM client comprises:
   inserting the basic authentication information to an authentication information insertion region of a notification message, which is defined in OMA standard;
   inserting the unique authentication information to one of a trigger header field and a trigger body field of the notification message; and
   transmitting the notification message to the DM client.

6. The control method as claimed in claim 2, wherein the step of creating the basic authentication information comprises:
   creating the basic authentication information including a setup value for setting communication between the DM server and the DM client.

7. The control method as claimed in claim 6, wherein the setup value is a nonce value.

8. The control method as claimed in claim 1, further comprising:
   attempting to access the DM server by the DM client when the authentication using the transformed basic authentication information is successful.

9. The control method as claimed in claim 1, further comprising:
   attempting to access the DM server by the DM client when the authentication using the transformed unique authentication information is successful.

10. A device management (DM) system, comprising:
   a DM server configured to transmit a notification message in response to a device control request of a user, the notification message including 64 bits of unique authentication information having previously stored unique information of a device and 64 bits of basic authentication information having a setup value for setting up communication; and a device having a DM client configured to
- receive the notification message,
- extract the basic authentication information from the received notification message,
- transform the extracted basic authentication information to 128 bits of basic authentication information,
- attempt to perform authentication using the transformed basic authentication information,
- if the DM client receiving the notification message fails to authenticate the device control request using the transformed basic authentication information, extract the unique authentication information from the received notification message, transform the extracted unique authentication information to 128 bits of unique authentication information, and attempt to perform authentication using the extracted unique authentication information, and
- discard, by the DM client, the notification message, if the DM client fails to authenticate the device control request using the transformed unique authentication information.

11. The device management system claimed in claim 10, wherein the DM server is configured to create the unique authentication information using at least one of an IMEI (international mobile equipment identifier) and an ESN (electronic serial number) of the device.

12. The device management system claimed in claim 10, wherein the DM server is configured to create the basic authentication information including a setup value for setting communication with the DM client.

13. The device management system claimed in claim 12, wherein the setup value is a nonce value.

14. The device management system claimed in claim 10, wherein the DM server is configured to insert the basic authentication information and the unique authentication information to an authentication information insertion region of the notification message, defined by OMA (open mobile alliance) standard.

15. The device management system claimed in claim 10, wherein the DM server is configured to insert the basic authentication information into an authentication information insertion region of the notification message, defined by OMA (open mobile alliance) standard, and the unique authentication information into one of a trigger header field and a trigger body field of the notification message.

16. The device management system claimed in claim 10, wherein the DM client is configured to attempt to access the DM server when the authentication is successful using at least one of the transformed basic authentication information and the transformed unique authentication information.

17. A terminal, comprising:
- a device management (DM) client configured to receive a notification message from a server to perform a terminal control operation, the notification message including 64 bits of basic authentication information having a set value for establishing a communication link between the server and the DM client and 64 bits of unique authentication information having unique information of the terminal,
- wherein the DM client is configured to perform at least one authentication process based on the notification message, and
- wherein the at least one authentication process comprises
  - extracting the unique authentication information from the received notification message,
  - transforming the extracted basic authentication information to 128 bits of unique authentication information,
  - attempting to perform authentication using the transformed basic authentication information,
  - if the DM client receiving the notification message fails to authenticate the device control request using the transformed basic authentication information, extracting the unique authentication information from the received notification message, transforming the extracted unique authentication information to 128 bits of unique authentication information, and attempting to perform authentication using the extracted unique authentication information, and
  - discarding the notification message if the DM client fails to authenticate the device control request using the transformed unique authentication information.

18. The terminal of claim 17, wherein both the basic authentication information and the unique authentication information are provided in a digest field of the notification message.

19. The terminal of claim 17, wherein the basic authentication information is provided in a digest field of the notification message, whereas the unique authentication information is provided in either a trigger header field or a trigger body field of the notification message.

* * * * *